US012779821B2

(12) United States Patent
Lei et al.

(10) Patent No.: US 12,779,821 B2
(45) Date of Patent: Nov. 3, 2026

(54) HIGH-STRENGTH STEEL COMPOSITE GALVANIZED SHEET RESISTANT TO LME CRACKING DURING SPOT WELDING, AND PREPARATION METHOD THEREFOR

(71) Applicant: BAOSHAN IRON & STEEL CO., LTD., Shanghai (CN)

(72) Inventors: Ming Lei, Shanghai (CN); Hua Pan, Shanghai (CN); Li Wang, Shanghai (CN); Peng Xue, Shanghai (CN); Zhongqu Sun, Shanghai (CN); Tianhai Wu, Shanghai (CN); Chengjie Liu, Shanghai (CN); Yue Wu, Shanghai (CN); Zhongling Wen, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 23 days.

(21) Appl. No.: 18/838,230

(22) PCT Filed: Feb. 17, 2023

(86) PCT No.: PCT/CN2023/076709
§ 371 (c)(1),
(2) Date: Aug. 13, 2024

(87) PCT Pub. No.: WO2023/155868
PCT Pub. Date: Aug. 24, 2023

(65) Prior Publication Data

US 2025/0144916 A1 May 8, 2025

(30) Foreign Application Priority Data

Feb. 17, 2022 (CN) ......................... 202210145312.6

(51) Int. Cl.
*B32B 15/01* (2006.01)
*C21D 8/02* (2026.01)
(Continued)

(52) U.S. Cl.
CPC .............. *B32B 15/013* (2013.01); *C21D 8/02* (2013.01); *C21D 8/0226* (2013.01);
(Continued)

(58) Field of Classification Search
CPC .......................... B32B 15/013; B32B 2311/20
(Continued)

(56) References Cited

U.S. PATENT DOCUMENTS

2013/0189539 A1* 7/2013 Van De Langkruis .. C21D 8/04 29/527.4
2019/0040487 A1 2/2019 Enloe et al.
2019/0153559 A1 5/2019 Song et al.

FOREIGN PATENT DOCUMENTS

CN 1273157 A 11/2000
CN 102553918 A 7/2012
(Continued)

OTHER PUBLICATIONS

International Search Report for PCT/CN2023/076709 dated May 9, 2023.
(Continued)

*Primary Examiner* — Katherine A Christy
(74) *Attorney, Agent, or Firm* — Lei Fang, Esq.; Smith Tempel Blaha LLC

(57) ABSTRACT

A high-strength steel composite galvanized sheet resistant to LME cracking during spot welding, and a preparation method therefor, wherein the high-strength steel composite galvanized sheet comprises a high-strength steel body (1), low-carbon steel composite layers (2) and a galvanized layer (3), wherein two low-carbon steel composite layers (2) are respectively compounded and rolled on two surfaces of the high-strength steel body (1), the galvanized layer (3) is formed on the surface of at least one low-carbon steel composite layer (2), and a high-strength steel composite
(Continued)

galvanized sheet is thus formed. The sensitivity of the high-strength steel composite galvanized sheet to LME during spot welding is reduced, LME cracking during spot welding is effectively avoided, the resistance spot-welding performance of the high-strength steel body is improved, and the mechanical properties of a spot-welded joint are obviously improved.

16 Claims, 3 Drawing Sheets

(51) Int. Cl.
*C21D 8/0221* (2026.01)
*C21D 8/0247* (2026.01)
*C21D 9/46* (2006.01)

(52) U.S. Cl.
CPC ......... *C21D 8/0236* (2013.01); *C21D 8/0263* (2013.01); *C21D 9/46* (2013.01); *B32B 2311/20* (2013.01)

(58) Field of Classification Search
USPC .......................................................... 428/659
See application file for complete search history.

(56) References Cited

FOREIGN PATENT DOCUMENTS

| | | | |
|---|---|---|---|
| CN | 105296854 | A | 2/2016 |
| CN | 108504956 | A | 9/2018 |
| JP | S61149468 | A | 7/1986 |
| JP | H04236749 | A | 8/1992 |
| WO | 2021112480 | A1 | 6/2021 |

OTHER PUBLICATIONS

International Written Opinion for PCT/CN2023/076709 dated May 9, 2023.

* cited by examiner

HIGH-STRENGTH STEEL COMPOSITE GALVANIZED SHEET RESISTANT TO LME CRACKING DURING SPOT WELDING, AND PREPARATION METHOD THEREFOR

CROSS-REFERENCE TO RELATED APPLICATIONS

This application is a 371 U.S. National Phase of PCT International Application No. PCT/CN2023/076709 filed on Feb. 17, 2023, which claims benefit and priority to Chinese patent application No. CN202210145312.6 filed on Feb. 17, 2022, the contents of each of the above listed applications are incorporated by reference herein in their entireties.

TECHNICAL FIELD

The present disclosure relates to a composite high-strength steel plate and a preparation method therefor, in particular to a composite high-strength galvanized steel plate having resistance to spot-welding LME (Liquid Metal Embrittlement) cracks and the preparation method therefor.

BACKGROUND ART

The R&D and application of automotive lightweight materials are related to the energy saving, emission reduction, safety, cost and many other aspects of the vehicle, and are of great significance to saving the world's energy, natural resources and environmental protection, and have become the leading direction of the development of automotive materials. High-strength materials represented by AHSS (Advanced high strength steel) have well shown great potential to reduce the weight of automobiles and achieve energy saving.

In order to improve the corrosion resistance of high-strength steel, galvanizing processes including hot-dip galvanizing and electro-galvanizing are widely adopted. The use of galvanized high-strength steels in the automotive field inevitably requires joining technology. However, the subsequent hot processing of galvanized high-strength steel, such as hot stamping and resistance spot welding, is prone to liquid metal embrittlement LME phenomenon, which has become one of the main obstacles to the application of galvanized high-strength steel in the automotive field.

LME cracks are characterized by the fact that when the base metal is in contact with other kinds of liquid metal, i.e., the melted galvanized layer, under the action of external stress or internal stress caused by restraint, thermal expansion, phase transformation, etc., the liquid metal will penetrate along the grain boundary of the base metal, and crack will be formed in severe cases, resulting in the reduction of the plasticity of the base metal. The contact between the LME-sensitive base metal and the liquid metal, the stress, and the suitable temperature range are the three necessary conditions for the formation of LME cracks. Since the high-strength galvanized steel plate can meet the above three conditions at the same time when it is subjected to resistance spot welding, the spot-welding LME crack problem of high-strength galvanized steel plate is particularly serious. These steel grades have general characteristics including the presence of residual austenite, high strength, and relatively high content of carbon, silicon, and manganese. Among these steel grades, the second-generation AHSS and the third-generation AHSS are the most sensitive to spot-welding LME.

Chinese patent application CN201610963996.5 discloses a galvanized high-strength steel resistance spot welding method with good joint performance, which uses three welding pulses in a spot welding cycle; wherein the first welding pulse and the second welding pulse are used to generate a melt nugget and inhibit the formation of LME cracks, wherein the first welding pulse generates a melt nugget with a diameter of 3.75T1/2-4.25T1/2, and T is the plate thickness; wherein the second welding pulse makes the melt nugget grow slowly; wherein the third welding pulse is a slow cooling pulse used to improve the plasticity of soldering joint. Through the optimization of the spot-welding process, this method minimizes the time and degree of the condition that is necessary for inducing LME due to the presence of spot-welding joint, but cannot completely eliminate the inducement of LME.

Chinese patent application CN 201810819361.7 discloses a multilayer steel and a method for reducing liquid metal embrittlement. The multilayer steel includes a core formed by phase change-induced plasticity (TRIP) steel, a decarburization layer located on at least one side of the core with a reduced carbon content relative to the core, and a zinc-based layer located outside of the decarburization layer, wherein the decarburization layer may be composed of at least 80% of ferrite, so as to reduce or eliminate LME. This method can only alleviate the problem of LME cracks to a certain extent. There are problems for example, the thickness and uniformity of the decarburization layer are not easy to control, and the surface properties of the base metal are unstable.

Chinese patent application CN201780080831.6 discloses a multi-layer galvanized alloy steel with excellent spot-welding performance and corrosion resistance. The multi-layer galvanized alloy steel comprises a base iron and multi-clad layers formed on the base iron, wherein each of the multi-clad layers is any one of Zn clad layer, Mg clad layer and Zn—Mg alloy clad layer, and the weight ratio of Mg contained in the multi-clad layers is 0.13 to 0.24 relative to the total weight of the multi-clad layers. In this method, it is difficult to ensure the adhesion between the clad layer and the substrate, and the stability and uniformity of the clad layer are difficult to control due to the complex phase transformation of Zn—Mg alloy.

SUMMARY

One object of the present disclosure is to provide a composite high-strength galvanized steel plate having resistance to spot-welding LME cracks, which has a lower spot-welding LME sensitivity, so as to improve the resistance spot-welding performance of the composite high-strength galvanized steel plate.

Another object of the present disclosure is to provide a method for preparing the composite high-strength galvanized steel plate having resistance to spot-welding LME cracks, which can reduce the spot-welding LME sensitivity of the composite high-strength galvanized steel plate through the composite rolling of low carbon steel composite layer while ensuring the performance of the base metal, and alleviate the problem of spot-welding LME cracks.

The present disclosure is achieved as follows:

A composite high-strength galvanized steel plate having resistance to spot-welding LME cracks, which comprises a high-strength steel matrix, low carbon steel composite layers, and a galvanized layer; wherein two low carbon steel composite layers are affixed on two surfaces of the high-strength steel matrix by composite rolling, the galvanized layer is formed on the surface of at least one of the low carbon steel composite layers, thereby consisting the composite high-strength galvanized steel plate.

In the present disclosure, the high-strength steel matrix is a high-strength steel that is sensitive to spot-welding LME, which may comprise C, Si and Mn, may further comprise Ti and Cr, and optionally may comprise one or more of Nb, B, Al and the like, with a balance of Fe and unavoidable impurities, such as P and S.

In some embodiments, by mass percentage, in the high-strength steel matrix, C is ≥0.10%, Mn is ≥1.0%, and Si is ≥0.07%. In some embodiments, by mass percentage, in the high-strength steel matrix, C is ≥0.14%, Mn is ≥1.5% and Si is ≥0.4%. In some embodiments, by mass percentage, in the high-strength steel matrix, C: 0.14~0.60%, Mn: 1.5~16% and Si: 0.07~2.0%. In some embodiments, by mass percentage, in the high-strength steel matrix, C: 0.14~0.30%, Mn: 1.5~3.5% and Si: 0.4~2.0%.

When the high-strength steel matrix comprises Ti and Cr, the Ti content may be ≥0.01%, such as 0.01~0.10% or 0.01~0.05%; the Cr content may be ≥0.01%, such as 0.01~0.10% or 0.01~0.05%.

Optionally, the high-strength steel may further comprise 0~0.06% of Nb, 0~0.005% of B and 0~2.0% of Al.

Generally, the content of impurity P in the high-strength steel is ≤0.01%, and the content of S is ≤0.01%.

In some embodiments, the high-strength steel of the present disclosure comprises C: 0.1~0.3%, Si: 0.4~2.50%, Mn: 1.0~11.0% and Al: 0~2.0%.

In the present disclosure, the high-strength steel refers to the steel having a tensile strength of ≥780 MPa, preferably ≥980 MPa, more preferably ≥1180 MPa. In some embodiments, the high-strength steel used herein has a tensile strength of 780~1500 MPa, preferably 1180~1500 MPa.

The present disclosure can be implemented using the high-strength steel that is well known in the art. Exemplary high-strength steels can be one or more selected from the group consisting of QP steel, TRIP steel, DH steel, 7Mn steel, 10Mn steel and MS steel. Exemplary QP steel may comprise C: 0.1~0.25%, Si: 0.4~2.50%, Mn: 1.50~3.00% and Al: 0.03~1.10%. Exemplary TRIP steel may comprise C: 0.15~0.3%, Si: 0.6~2.0%, Mn: 1.6~2.5%, Al: 0.02~0.90%. Exemplary DH steel may comprise C: 0.12~0.21%, Si: 0.3~0.9%, Mn: 1.6~2.5% and Al: 0.02~0.60%. Exemplary 7Mn steel may comprises C: 0.1~0.3%, Si: 0.1~2.0%, Mn: 6~8% and Al: 1~2%. Exemplary 10Mn steel may comprise C: 0.1~0.3%, Si: 0.1~2.0%, Mn: 9~11% and Al: 1~2%. Exemplary MS steel may comprise C: 0.1~0.3%, Si: 0.1~0.5% and Mn: 1.0~1.8%. These steels may comprise well known components comprised in this type of steel.

In some embodiments, the steel used for the high-strength steel matrix is a high-strength steel sensitive to spot-welding LME. The high-strength steel matrix comprises C≥0.14%, Mn≥1.5%, Si≥0.4% by mass percentage, and has a tensile strength of ≥780 MPa. In the present disclosure, the steel used for the low carbon steel composite layer is a low carbon steel that is not sensitive to spot-welding LME. The low carbon steel comprises C: ≤0.1%, Mn: ≤1.1% by mass percentage.

In some embodiments, by mass percentage, the low carbon steel composite layer comprises C and Mn. The C content is ≤0.1%, the Mn content is ≤0.7%, and the tensile strength is ≤590 MPa.

In some embodiments, by mass percentage, the low carbon steel comprises C: 0.001~0.1% and Mn: 0.1~1.1%.

In some embodiments, by mass percentage, the low carbon steel comprises C: 0.001~0.1%, Si: 0.001~0.50%, Mn: 0.1~0.1.1%, Nb: 0~0.02%, Ti: 0~0.025%, Ni: 0~0.025%, Cr: 0~0.05%, P: ≤0.05%, with a balance of Fe and unavoidable impurities.

In some embodiments, by mass percentage, the low carbon steel comprises C: 0.001~0.08%, Si: 0.001~0.05%, Mn: 0.1~0.7%, Nb: 0~0.02%, Ti: 0~0.025%, Ni: 0~0.025%, Cr: 0~0.05%, P: ≤0.05%, with a balance of Fe and unavoidable impurities.

In some embodiments, the low carbon steel can be selected from one or more of the well-known IF steel, aluminum killed steel, cold-rolled carbon structural steel, phosphorus high-strength steel, bake-hardening steel (BH steel) and low-alloy steel. Exemplary IF steel may contain C: 0.001~0.01% and Mn: 0.10~1.00%. Exemplary aluminum killed steel may contain C: 0.01~0.1% and Mn: 0.1~0.5%. Exemplary BH steel may contain C: 0.002~0.1% and Mn: 0.10~1.00%. Exemplary low-alloy steel may contain C: 0.02~0.1%, Mn: 0.5~1.1% and Si: 0.05~0.5%.

In some embodiments, the low carbon steel used in the present disclosure has a tensile strength in the range of 150~590 MPa. In some embodiments, the low carbon steel used in the present disclosure has a tensile strength in the range of 150~340 MPa.

The original slab thickness of the high-strength steel matrix and the original slab thickness of the low carbon steel composite layer should satisfy the following formula: $L\times A+M\times B+N\times C=T$;

- wherein, A is the percentage of the original slab thickness of one low-carbon steel composite layer to the thickness of the total assembled slab, C is the percentage of the original slab thickness of the other low-carbon steel composite layer to the thickness of the total assembled slab, and B is the percentage of the original slab of the high-strength steel matrix to the thickness of the total assembled slab, and A+B+C=100%; wherein the total assembled slab is the total thickness of the original slab comprising the high-strength steel matrix and the two low carbon steel composite layers;
- wherein L is the tensile strength of one low carbon steel composite layer after annealing, N is the tensile strength of the other low carbon steel composite layer after annealing, M is the tensile strength of the high-strength steel matrix after annealing;
- wherein T is the target tensile strength of the composite high-strength galvanized steel plate;
- wherein, the unit of the tensile strength is MPa, and the unit of the thickness is micron.

In the composite high-strength galvanized steel plate, the thickness of the two low carbon steel composite layers may be the same or different.

In the composite high-strength galvanized steel plate, the composition of the two low carbon steel composite layers may be the same or different.

In the composite high-strength galvanized steel plate, the thickness of each low carbon steel composite layer is 10-200 μm, preferably 20-200 μm.

In the composite high-strength galvanized steel plate, the thickness of the galvanized layer is 4-26 μm.

In the composite high-strength galvanized steel plate, A:B and C:B are preferably in the range of 1:35.5-1:5.

The spot-welding LME crack resistance of the composite high-strength galvanized steel plate is as follows: there are no LME cracks in the joint before the occurrence of welding spatter; after the occurrence of welding spatter, the length of Type A LME cracks in the joint does not exceed 10% of the plate thickness and the number does not exceed 6, and the length of Type D LME cracks does not exceed 3% of the plate thickness and the number does not exceed 3, and there are no Type B or Type C LME cracks.

In some embodiments, the composite high-strength galvanized steel plate has a yield strength of ≥680 MPa, a tensile strength of ≥980 MPa, and an elongation of ≥12%.

A method for preparing the composite high-strength galvanized steel plate having resistance to spot-welding LME cracks, which comprises the following steps:

Step 1: taking an original slab of a high-strength steel matrix and original slabs of two low-carbon steel composite layers, affixing the original slabs of the two low-carbon steel composite layers to two surfaces of the original slab of the high-strength steel matrix, and welding the original slab edges of the two low-carbon steel composite layers with the original slab edge of the high-strength steel matrix to form a total slab;

Step 2: subjecting the total slab to primary rolling after heating through blooming process of thick plate to reduce the thickness of the total slab, and then hot rolling, pickling, cold rolling and annealing, so that the original slab of the high-strength steel matrix and the original slabs of the two low-carbon steel composite layers are metallurgically combined to form a billet having a tensile strength of T;

Step 3: Plating a galvanized layer on at least one side of the billet to form the composite high-strength galvanized steel plate.

In the Step 1, before the original slab of the two low-carbon steel composite layers 2 and the original slab of the high-strength steel matrix 1 are stacked, the affixing surfaces of the high-strength steel matrix 1 and the two low-carbon steel composite layers 2 need to be polished and cleaned.

The method of plating the galvanized layer comprises hot dipping or electroplating.

The hot rolling, pickling, cold rolling, annealing, hot dipping and electroplating can be carried out using methods known in the art. For example, exemplary hot rolling includes: the billet is heated to 1200-1280° C., held for 0.5~4 hours and then subjected to hot rolling with a final rolling temperature of 850° C.-1000° C., followed by cooling to 400-650° C. at a rate of 30-100° C./s and then coiling.

The deformation of cold rolling may be generally controlled at 35~75%, such as 50~75%.

Exemplary annealing may include: the billet is heated to a soaking temperature of 800-830° C. at a rate of 1~20° C./s, with a holding time of 30~240 seconds, then cooled to 650~750° C. at a rate of 2~20° C./s (e.g. 3~10° C./s), and then cooled to 250~350° C. at a rate of 20~80° C./s and held for 10~120 seconds. In some embodiments, it is heated to a soaking temperature of 800~830° C. at a rate of 1~20° C./s, with a holding time of 30~180 seconds, cooled to 650~750° C. at a rate of 3~10° C./s, and then cooled to 280~300° C. at a rate of 20~80° C./s and held for 10~120 seconds, and then heated to 450~470° C. at a rate of 5~20° C./s and held for 200~300 seconds. In some embodiments, it is heated to a soaking temperature of 810-830° C. at a rate of 1~20° C./s, with a holding time of 30~240 seconds and a dew point temperature controlled at −50~20° C., then cooled to 650~720° C. at a rate of 2~20° C./s, and then cooled to 250~350° C. at a rate of 20~80° C./s and held for 10~120 seconds.

Exemplary hot-dip galvanizing includes galvanizing temperature of 440~500° C., galvanizing time of 5~200 seconds. After galvanizing, it is cooled to room temperature at a cooling rate of not less than 20° C./s.

It should be understood that the appropriate hot rolling, pickling, cold rolling, annealing, hot dipping/electroplating process can be selected according to the high-strength steel and low carbon steel as used.

The present disclosure has the following beneficial effects compared with the prior art:

1. In the present disclosure, the low-carbon steel composite layers which are not sensitive to spot-welding LME cracks are affixed on two surfaces of the high-strength steel matrix by composite rolling. The low-carbon steel composite layers play a role of barrier during spot welding, so as to avoid the penetration of liquid zinc into the base metal of the high-strength steel matrix along the grain boundary, thereby fundamentally solving the problem of spot-welding LME cracks of the high-strength steel matrix. While ensuring the mechanical properties of the base metal, it has good resistance spot welding performance and has extremely low spot-welding LME sensitivity.
2. When the composite high-strength galvanized steel plate of the present disclosure is subjected to spot-welding, there is no LME crack in the joint before the occurrence of welding spatter, and after the occurrence of welding spatter, the length of the Type A LME cracks in the joint does not exceed 10% of the plate thickness, and the number is less than 6, the length of the Type D LME cracks does not exceed 3% of the plate thickness, and the number is less than 3, there is no Type B or Type C LME cracks, and its basic welding performance and the base metal mechanical properties can satisfy the application requirements of automobile manufacturing and other related fields.

In the present disclosure, the low-carbon steel composite layers are affixed on the surface of the high-strength steel matrix by composite rolling. It avoids the penetration of liquid zinc into the base metal along the grain boundary during spot-welding, reduces the spot-welding LME sensitivity of the composite high-strength galvanized steel plate, effectively avoids the occurrence of spot-welding LME cracks, alleviates the problem of spot-welding LME cracks and improves the resistance spot-welding performance of the high-strength steel matrix. The mechanical properties of spot-welding joints are significantly improved.

Figure 1:
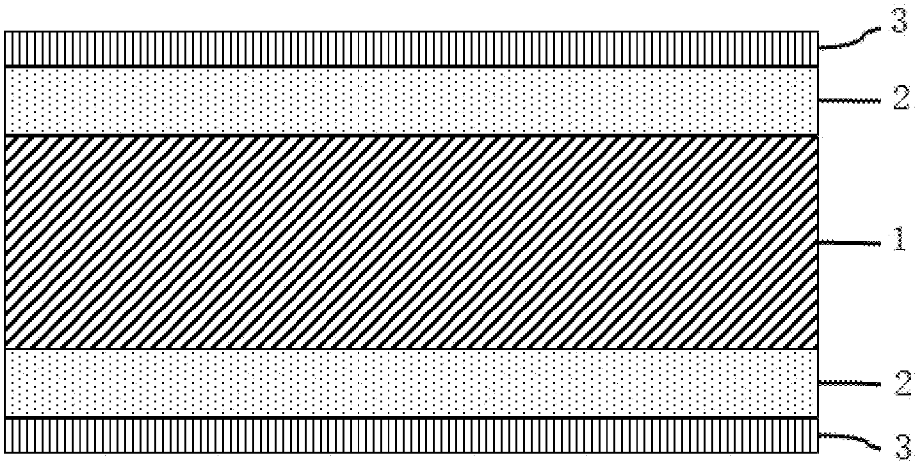
FIG. 1 is a cross-sectional view of a composite high-strength galvanized steel plate having resistance to spot-welding LME cracks according to the present disclosure.

In the FIG. 1 is the high-strength steel matrix, 2 is the low carbon steel composite layer, and 3 is the galvanized layer.

DETAILED DESCRIPTION

The present disclosure will be further described in detail below in conjunction with the accompanying drawings and Examples. Unless otherwise specified, the composition of the steel involved herein conforms to the composition range specified in GB/T 13304.1-2008.

Referring to FIG. 1, a composite high-strength galvanized steel plate having resistance to spot-welding LME cracks comprises a high-strength steel matrix 1, a low-carbon steel composite layer 2 and a galvanized layer 3; wherein two low carbon steel composite layers are affixed on two surfaces of the high-strength steel matrix 1 by composite rolling, the galvanized layer 3 is formed on the surface of at least one of the low carbon steel composite layers 2, thereby consisting the composite high-strength galvanized steel plate. Different steel grades have different susceptibility to spot-welding LME, and spot-welding LME cracks occur on the surface of galvanized high-strength steel. The composite rolling of low carbon steel composite layer 2 makes the surface of high-strength steel matrix 1 not sensitive to spot-welding LME cracks, so that the occurrence of spot-welding LME cracks is avoided fundamentally.

The high-strength steel matrix 1 is a high strength steel that is sensitive to spot-welding LME. The high-strength steel matrix 1 comprises, by mass percentage, C≥0.14%, Mn≥1.5%, Si≥0.4%, with a balance of Fe, other alloy elements and impurity elements, and has a tensile strength of ≥780 MPa. The high-strength steel matrix 1 is any high strength steel that is sensitive to spot-welding LME, such as QP (Quenching and Partitioning steel), TRIP (transformation induced plasticity steel), TWIP (twinning induced plasticity steel), DH (dual-phase high ductility steel), 7Mn (Fe-7% Mn-0.3% C-2% Al), 10Mn (Fe-10% Mn-0.3% C-2% Al), DP (dual-phase steel), MS (Martensitic Steel), etc.

The low-carbon steel composite layer 2 is a low-carbon steel that is not sensitive to spot-welding LME. The low-carbon steel composite layer 2 comprises C and Mn. By mass percentage, the C content is ≤0.1%, the Mn content is ≤0.7%, and the tensile strength is ≤590 MPa grade. For example, IF (interstitial-free steel), aluminum killed steel, BH steel (Bake-Hardening steel), low alloy steel may be used.

The original slab thickness of the high-strength steel matrix 1 and the original slab thickness of the low carbon steel composite layer 2 should satisfy the following formula: L×A+M×B+N×C=T, wherein, A is the percentage of the original slab thickness of one of the low-carbon steel composite layers 2 to the thickness of the total assembled slab, C is the percentage of the original slab thickness of the other of the low-carbon steel composite layers 2 to the thickness of the total assembled slab, and B is the percentage of the original slab of the high-strength steel matrix 1 to the thickness of the total assembled slab, and A+B+C=100%; wherein the total assembled slab is the total thickness of the original slab comprising the high-strength steel matrix 1 and the two low carbon steel composite layers 2;

wherein L is the tensile strength of one of the low carbon steel composite layers 2 after annealing, N is the tensile strength of the other of the low carbon steel composite layers 2 after annealing, M is the tensile strength of the high-strength steel matrix 1 after annealing;

wherein T is the target tensile strength of the composite high-strength galvanized steel plate.

In the composite high-strength galvanized steel plate, each low carbon steel composite layer 2 has a thickness of 10-200 μm. The two low carbon steel composite layers 2 on two sides of the high-strength steel matrix 1 may be the same or different.

In the composite high-strength galvanized steel plate, the thickness of the galvanized layer 3 is 4-26 μm.

A method for preparing the composite high-strength galvanized steel plate having resistance to spot-welding LME cracks, which comprises the following steps:

Step 1: an original slab of a high-strength steel matrix 1 and original slabs of two low-carbon steel composite layers 2 are taken and the original slabs of the two low-carbon steel composite layers 2 are affixed to two surfaces of the original slab of the high-strength steel matrix 1, and the original slab edges of the two low-carbon steel composite layers 2 and the original slab edge of the high-strength steel matrix 1 are welded to form a total assembled slab.

Before the original slab of the two low-carbon steel composite layers 2 and the original slab of the high-strength steel matrix 1 are stacked, the affixing surfaces of the high-strength steel matrix 1 and the two low-carbon steel composite layers 2 need to be polished and cleaned to ensure the smoothness.

Step 2: the total assembled slab is subjected to primary rolling after heating through blooming process of thick plate to reduce the thickness of the total assembled slab, and then hot rolling, pickling, cold rolling and annealing, so that the original slab of the high-strength steel matrix 1 and the original slabs of the two low-carbon steel composite layers 2 are metallurgically combined to form a billet having a tensile strength of T. Primary rolling, hot rolling, pickling, cold rolling and annealing adopt the existing processes, which are not repeated here.

Step 3: a galvanized layer 3 is plated on at least one side of the billet by hot dipping, electroplating or other ways to form the composite high-strength galvanized steel plate. The method of plating the galvanized layer 3 comprises hot dipping, electroplating or existing processes, which are not repeated here.

The composite high-strength galvanized steel plate of the present disclosure is evaluated for spot-welding LME sensitivity through Rapid LME Test Procedure for Coated Sheet Steels V2.0 standard issued by the North American Automotive/Steel Partnership Organization (A/SP). In this standard, cracks are divided into four categories: Type A, Type B, Type C and Type D according to the distribution and position of cracks, wherein Type A cracks are located in the contact area between the end of spot welding electrode and the steel plate on the upper and lower surfaces of the spot welding joint, and it is required in the standard that the length of Type A cracks should be ≤10% of the plate thickness before the occurrence of welding spatter, and there is no requirement in the standard for the length of Type A cracks after the occurrence of welding spatter; Type B cracks are located in the non-contact area between the spot welding electrode and the steel plate on the upper and lower surfaces of the spot welding joint, and it is required in the standard that the length of Type B cracks should be ≤5% of the plate thickness before and after the occurrence of welding spatter; Type C cracks are located in the contact area of the overlap of the upper and lower steel plates in the spot welding joint, and it is required in the standard that the length of Type C cracks should be ≤5% of the plate thickness before and after the occurrence of welding spatter; Type D cracks are located in the shoulder area of the indentation on the upper and lower surfaces of the spot welding joint, which has the largest deformation of the weld thickness, and it is required in the standard that the length of Type D cracks should be ≤5% of the plate thickness before the occurrence of welding spatter and the length of Type D cracks should be ≤10% of the plate thickness after the occurrence of welding spatter.

The composite high-strength galvanized steel plate of the present disclosure has good resistance to spot welding LME cracks: no LME cracks in the joint before occurrence of welding spatter, and after the occurrence of welding spatter, the length of Type A LME cracks in the joint does not exceed 10% of the plate thickness and the number does not exceed 6, and the length of the Type D LME crack does not exceed 3% of the plate thickness and the number does not exceed 3, and there are no Type B or Type C LME cracks. At the same time, the basic welding performance and the base metal mechanical properties of the composite high-strength galvanized steel plate of the present disclosure meet the application requirements of the related fields.

Example 1

Referring to FIG. 1, the original slab of QP1180 was taken as the high-strength steel matrix 1. The original slab of the high-strength steel matrix 1 comprised, by mass percentage, 0.18% of C, 1.67% of Si, 2.73% of Mn, 0.0089% of P, 0.0009% of S, 0.02% of Ti, 0.03% of Cr, with a balance of Fe and unavoidable impurity elements.

The original slab of IF steel DC04 was taken as the low carbon steel composite layer 2. The original slab of the low carbon steel composite layer 2 comprised, by mass percentage, 0.0015% of C, 0.002% of Si, 0.114% of Mn, 0.0119% of P, 0.0044% of S, with a balance of Fe and unavoidable impurity elements.

The two low-carbon steel composite layers 2 had the same original slab thickness of 24 mm, and the original slab thickness of the high-strength steel matrix 1 was 182 mm. The thickness ratio of the original slab of the high-strength steel matrix 1 and the original slab (one piece) of the low-carbon steel composite layer 2 was 7.5:1. In this Example, A=C=10.5%, L=N=150 MPa, B=79%, M=1250 MPa, T=1019 MPa. Through the process of assembling-blooming of thick plate-hot rolling-pickling-cold rolling-annealing, the original slabs of two low-carbon steel composite layers 2 (with the same thickness) were affixed on two surfaces of the original slab of high-strength steel matrix 1 by composite rolling to obtain a billet, and the galvanized layer 3 was coated on two surfaces of the billet by hot-dip galvanizing to form a composite high-strength galvanized steel plate. The specific process was as follows:

(1) hot rolling: the slab was heated to 1200° C. and held for 0.5 h, then hot rolled with a final rolling temperature of 850° C., followed by cooled to 400° C. at a rate of 30 and coiled;

(2) cold rolling: the cold rolling reduction was 50%;

(3) annealing: the steel was heated to a soaking temperature of 800° C. at a rate of 5° C./s and held for 50 sec; cooled to 650° C. at a rate of 3° C./s, then cooled to 280° C. at a rate of 20° C./s and held for 20 sec; and heated to 450° C. at a rate of 5° C./s and held for 200 sec;

(4) hot-dip galvanizing: the galvanizing temperature was 450° C., and the galvanizing time was 20 seconds. After galvanizing, it was cooled to room temperature at a cooling rate of no less than 20° C./s.

The total thickness of the final composite high-strength galvanized steel plate was 1.5 mm. The thickness of the two low carbon steel composite layers 2 was about 160 μm, and the thickness of the galvanized layer 3 was about 8.6 μm. The composite high-strength galvanized steel plate had a yield strength of 696 MPa, a tensile strength of 1074 MPa, and an elongation at break of 15%, which met the requirements of QP980GI. The central layer was QP steel structure and contained martensite and residual austenite.

Figure 2:
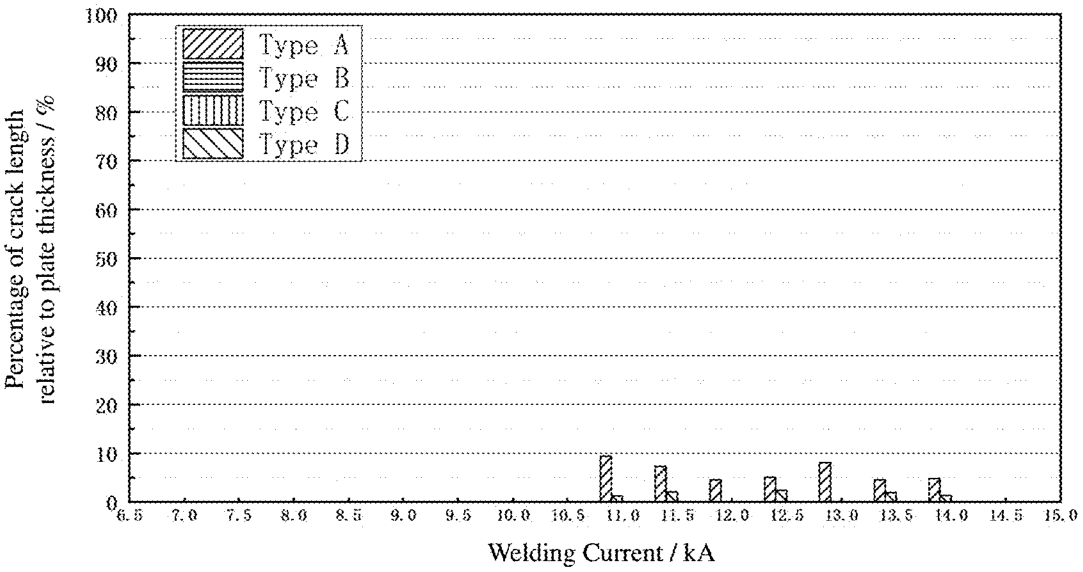
FIG. 2 is the spot-welding LME evaluation results (crack length) of the composite high-strength galvanized steel plate having resistance to spot-welding LME cracks according to the present disclosure in Example 1.
Figure 3:
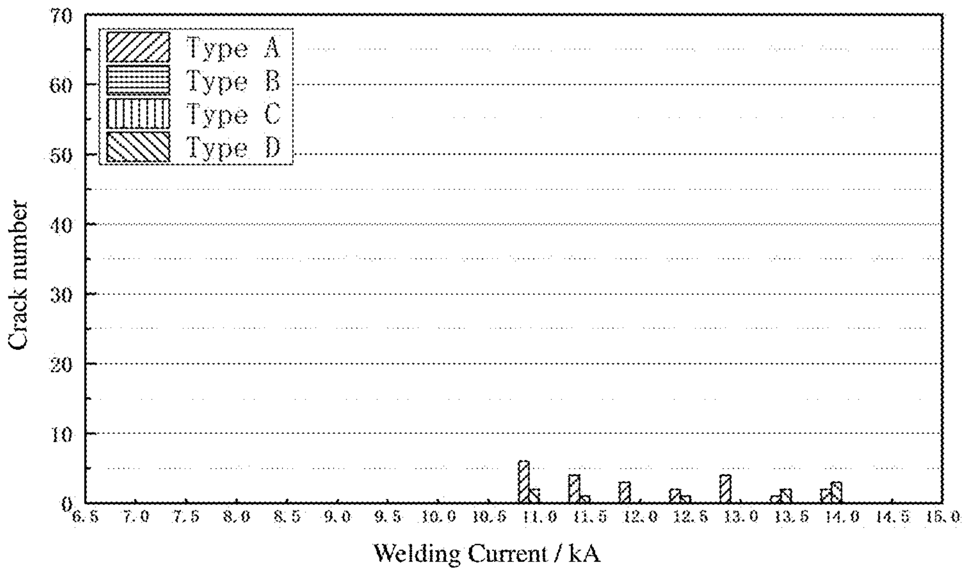
FIG. 3 is the spot-welding LME evaluation results (crack number) of the composite high-strength galvanized steel plate having resistance to spot-welding LME cracks according to the present disclosure in Example 1.

The composite high-strength galvanized steel plate obtained in this Example by composite rolling was evaluated for spot-welding LME sensitivity through Rapid LME Test Procedure for Coated Sheet Steels V2.0 standard issued by A/SP. Welding spatter occurred when the welding current is ≥11 kA. There were no LME cracks in the joint before the occurrence of welding spatter; and after the occurrence of welding spatter, the length of the Type A LME cracks in the joint did not exceed 10% of the plate thickness and the number did not exceed 6, the length of Type D LME cracks did not exceed 3% of the plate thickness, and the number did not exceed 3, and there were no Type B or Type C LME cracks, as shown in FIG. 2 and FIG. 3. According to the standard, the composite high-strength galvanized steel plate in the present Example belongs to a material that is low-sensitive to spot welding LME.

Figure 4:
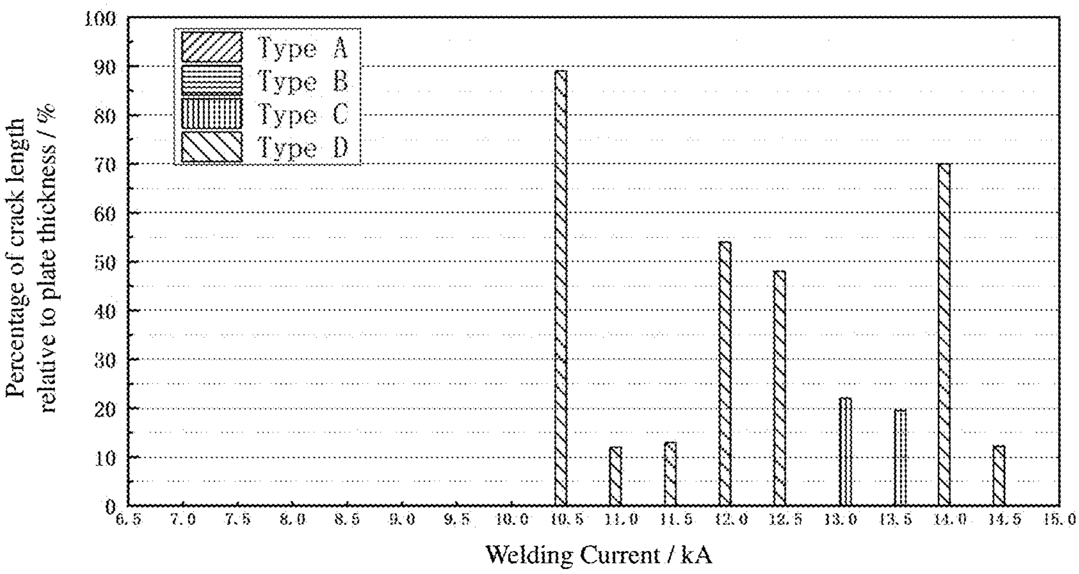
FIG. 4 is the spot-welding LME evaluation results (crack length) of the control example in Example 1.

A QP980GI steel with a thickness of 1.5 mm was used as a control. The QP980GI steel had a composition, by mass percentage, comprising 0.18% of C, 1.8% of Si, 2.3% of Mn, 0.001% of S, 0.012% of P, 0.017% of Ti, with a balance of Fe and unavoidable impurities. The QP980GI steel had mechanical properties as follows: a yield strength of 687 MPa, a tensile strength of 1068 MPa, an elongation at break of 22%. The QP980GI steel was evaluated for spot-welding LME sensitivity through Rapid LME Test Procedure for Coated Sheet Steels V2.0 standard. Welding spatter occurred when the welding current was ≥10.5 kA. Since Type A cracks were acceptable after welding spatter, Type A cracks were not included in the evaluation results of QP980GI as a control. However, there were Type D cracks with a length of nearly 90% of the plate thickness and Type C cracks with a length of more than 20% of the plate thickness, as shown in FIG. 4. According to this standard, the material is a material sensitive to spot welding LME.

Figure 5:
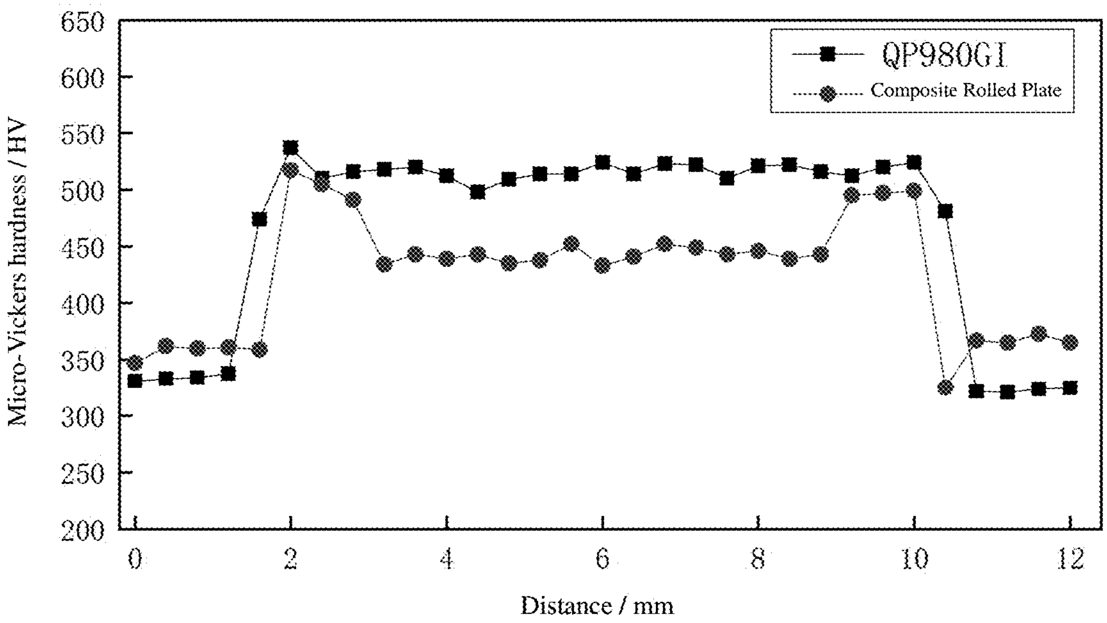
FIG. 5 is the spot-welding joint hardness distribution diagram of the composite high-strength galvanized steel plate having resistance to spot-welding LME cracks according to the present disclosure in Example 1, wherein —■— represents the spot-welding joint hardness distribution curve of the control example, —●— represents the spot-welding joint hardness distribution curve of the composite high-strength galvanized steel plate of Example 1.

Using the spot-welding parameters listed in Table 1, the basic spot-welding performance experiments were carried out for the present Example and the control Example, and the hardness distribution of spot-welding joint was shown in FIG. 5.

TABLE 1

| spot welding parameters | |
|---|---|
| Plate thickness/mm | 1.5 |
| Diameter of the electrode end surface/mm | 6 |
| Welding pressure/kN | 3.6 |
| First welding time/ms | 120 |
| First welding current/kA | I |
| First cooling time/ms | 20 |
| Second welding time/ms | 120 |
| Second welding current/kA | I |
| Second cooling time/ms | 20 |
| Third welding time/ms | 120 |

TABLE 1-continued

| spot welding parameters | |
|---|---|
| Third welding current/kA | I |
| Holding time/ms | 250 |

It can be seen from FIG. 5 that the weldable interval of the composite high-strength galvanized steel plate in the Example was 6.6 kA-9.0 kA, and the interval width was 2.4 kA. The weldable interval of QP980GI in the control example was 6.7 kA-9.1 kA, and the interval width was 2.4 kA. Their weldable intervals were comparable. The lower limit of the weldable interval corresponded to the welding current at which a melt nugget with a diameter of 5 mm was formed, and the upper limit of the weldable interval corresponded to the minimum welding current at the occurrence of welding spatter. Accordingly, when the diameter of the melt nugget was 5 mm for both cases, the joint strength TSS (i.e. tensile shear strength) and the joint strength CTS (i.e. cross tensile strength) were tested for two samples. For the inventive Example, the joint strength TSS was 13.89 kN (this TSS value was the average value of three samples tested in this Example) and the joint strength CTS was 6.22 kN (this CTS value was the average value of three samples tested in this Example). For the control Example, the joint strength TSS was 14.033 kN (this TSS value was the average value of three samples tested in the control Example) and the joint strength CTS was 4.27 kN (this CTS value was the average value of three samples tested in the control Example). It can be seen that the joint strength TSS of the present Example was comparable to that of the control Example. But the existence of the composite rolling layer of IF steel reduced the carbon equivalent in the melt nugget area, so that the hardness of the melt nugget was reduced and the plasticity was improved. Therefore, the joint strength CTS of the present Example is greatly improved compared with the control Example.

Example 2

Referring to FIG. 1, the original slab of QP1180 was taken as the high-strength steel matrix 1. The original slab of the high-strength steel matrix 1 comprised, by mass percentage, 0.18% of C, 1.67% of Si, 2.73% of Mn, 0.0089% of P, 0.0009% of S, 0.02% of Ti, 0.03% of Cr, with a balance of Fe and unavoidable impurity elements.

The original slab of IF steel DC04 was taken as the low carbon steel composite layer 2. The original slab of the low carbon steel composite layer 2 comprised, by mass percentage, 0.0015% of C, 0.002% of Si, 0.114% of Mn, 0.0119% of P, 0.0044% of S, with a balance of Fe and unavoidable impurity elements.

The original slab of the high-strength steel matrix 1 and the original slab of the low-carbon steel composite layer 2 (the original slab thicknesses of the low-carbon steel composite layers 2 on both sides were the same) were respectively assembled with a thickness ratio of 5.5:1, 7.5:1, 10.5:1, 16.5:1 or 35.5:1 (the ratio referred to the ratio of the original slab thickness of the high-strength steel matrix 1 to the original slab thickness of one low-carbon steel composite layer). The composite high-strength galvanized steel plates with different thickness of low-carbon steel composite layer 2 were obtained according to the preparing method of the present disclosure through the process of assembling-blooming of thick plate-hot rolling-pickling-coldrolling-annealing-hot-dip galvanizing. The details of each composite high-strength galvanized steel plate (1 #~5 #) were shown in Table 2. The specific process was as follows:

(1) hot rolling: the slab was heated to 1230° C. and held for 1 h, then hot rolled with a final rolling temperature of 920° C., followed by cooled to 550° C. at a rate of 50° C./s and coiled;

(2) cold rolling: the cold rolling reduction was 60%;

(3) annealing: the steel was heated to a soaking temperature of 810° C. at a rate of 10° C./s and held for 100 sec; cooled to 700° C. at a rate of 7° C./s, then cooled to 300° C. at a rate of 50° C./s and held for 80 sec; and heated to 470° C. at a rate of 15° C./s and held for 300 sec;

(4) hot-dip galvanizing: the galvanizing temperature was 480° C., and the galvanizing time was 100 seconds. After galvanizing, it was cooled to room temperature at a cooling rate of no less than 20° C./s.

TABLE 2 the composite high-strength galvanized steel plates 1#~5# with different thickness of low-carbon steel composite layer 2

| No. | High strength steel matrix 1 (original slab) | Low carbon steel composite layer 2 (original slab) | Thickness ratio | Thickness of the composite high-strength galvanized steel plate /mm | Tensile strength of the composite high-strength galvanized steel plate /Mpa | Composite layer thickness of the composite high-strength galvanized steel plate /μm |
|---|---|---|---|---|---|---|
| 1# | QP1180 | DC04 | 5.5:1 | 1.5 | 1020 | 200 |
| 2# | | | 7.5:1 | | 1074 | 160 |
| 3# | | | 10.5:1 | | 1141 | 120 |
| 4# | | | 16.5:1 | | 1165 | 80 |
| 5# | | | 35.5:1 | | 1201 | 40 |

The composite high-strength galvanized steel plates 1 #-5 # were evaluated for spot-welding LME sensitivity through Rapid LME Test Procedure for Coated Sheet Steels V2.0 standard issued by A/SP. The results showed that, for the composite high-strength galvanized steel plates 1 #-5 #, there were no LME cracks in the spot-welding joint before the occurrence of welding spatter; after the occurrence of welding spatter, there were no Type B or Type C LME cracks, the length of the Type A LME cracks did not exceed 10% of the plate thickness, and the number did not exceed 6; the length of the Type D LME cracks did not exceed 3% of the plate thickness, and the number did not exceed 3, as shown in Table 3.

TABLE 3 test results of LME cracks in spot-welding joint after welding spatter for the composite high-strength galvanized steel plates 1#~5#

| | LME cracks after welding spatter | | | | | | | |
|---|---|---|---|---|---|---|---|---|
| | Type A | | Type B | | Type C | | Type D | |
| No. | length | number | length | number | length | number | length | number |
| 1# | ≤5% | ≤2 | 0 | 0 | 0 | 0 | ≤2% | ≤1 |
| 2# | ≤10% | ≤6 | 0 | 0 | 0 | 0 | ≤3% | ≤3 |
| 3# | ≤9.5% | ≤4 | 0 | 0 | 0 | 0 | ≤2.8% | ≤2 |
| 4# | ≤10% | ≤6 | 0 | 0 | 0 | 0 | ≤3% | ≤3 |
| 5# | ≤10% | ≤6 | 0 | 0 | 0 | 0 | ≤3% | ≤3 |

Example 3

Referring to FIG. 1, the original slab of QP1180 was taken as the high-strength steel matrix 1. The original slab of the high-strength steel matrix 1 comprised, by mass percentage, 0.18% of C, 1.67% of Si, 2.73% of Mn, 0.0089% of P, 0.0009% of S, 0.02% of Ti, 0.03% of Cr, with a balance of Fe and unavoidable impurity elements.

The original slabs of cold-rolled carbon structural steel St37-2G, phosphorus high-strength steel HC220P, high-strength IF steel HC180Y, bake-hardening steel HC180B, and low-alloy high-strength steel HC300LA were taken as the original slab of low carbon steel composite layer 2, respectively. The main chemical compositions of original slabs of these five low carbon steel composite layers 2 were listed in Table 4, with a balance of Fe and unavoidable impurity elements.

TABLE 4 the main chemical compositions of the original slabs of the five low carbon steel composite layers 2

| No. | Brand | C | Si | Mn | P | Nb | Ti | Ni | Cr |
|---|---|---|---|---|---|---|---|---|---|
| 6# | St37-2G | 0.075 | 0.01 | 0.612 | 0.016 | \ | 0.002 | 0.006 | 0.026 |
| 7# | HC220P | 0.026 | 0.006 | 0.414 | 0.021 | \ | 0.001 | 0.009 | 0.027 |
| 8# | HC180Y | 0.002 | 0.045 | 0.277 | 0.043 | 0.012 | 0.018 | 0.011 | 0.042 |
| 9# | HC180B | 0.0018 | 0.007 | 0.233 | 0.023 | \ | \ | 0.011 | 0.026 |
| 10# | HC300LA | 0.0665 | 0.016 | 0.593 | 0.020 | 0.012 | \ | 0.019 | 0.029 |

The original slab of the high-strength steel matrix 1 and the original slab (one piece) of the five low-carbon steel composite layers 2 were assembled with a thickness ratio of 7.5:1. The composite high-strength galvanized steel plates 6 #-10 # with different low-carbon steel composite layer 2 were obtained according to the preparing method of the present disclosure through the process of assembling-bloomingofthickplate-hotrolling-pickling-coldrolling-an-nealing-hot-dip galvanizing. The details of each composite high-strength galvanized steel plate (6 #~-10 #) were shown in Table 5. The specific process was as follows:

(1) hot rolling: the slab was heated to 1250° C. and held for 2 h, then hot rolled with a final rolling temperature of 980° C., followed by cooled to 630° C. at a rate of 90° C./s and coiled;

(2) cold rolling: the cold rolling reduction was 70%;

(3) annealing: the steel was heated to a soaking temperature of 830° C. at a rate of 20° C./s and held for 160 sec; cooled to 750° C. at a rate of 8° C./s, then cooled to 300° C. at a rate of 70° C./s and held for 100 sec; and heated to 470° C. at a rate of 15° C./s and held for 200 sec;

(4) hot-dip galvanizing: the galvanizing temperature was 500° C., and the galvanizing time was 180 seconds. After galvanizing, it was cooled to room temperature at a cooling rate of no less than 20° C./s.

TABLE 5 the composite high-strength galvanized steel plates 6#~10# with different thickness of low-carbon steel composite layer 2

| No. | High strength steel matrix 1 (original slab) | low-carbon steel composite layer 2 (original slab) | Thickness ratio | Thickness of the composite high-strength galvanized steel plate/mm | Tensile strength of the composite high-strength galvanized steel plate /MPa | Composite layer thickness of the composite high-strength galvanized steel plate /μm |
|---|---|---|---|---|---|---|
| 6# | QP1180 | St37-2G | 7.5:1 | 1.5 | 1139 | 160 |
| 7# | | HC220P | | | 1092 | |
| 8# | | HC180Y | | | 1101 | |
| 9# | | HC180B | | | 1084 | |
| 10# | | HC300LA | | | 1143 | |

The composite high-strength galvanized steel plates 6 #-10 #obtained in this Example by composite rolling were evaluated for spot-welding LME sensitivity through Rapid LME Test Procedure for Coated Sheet Steels V2.0 standard issued by A/SP. The results showed that, for the composite high-strength galvanized steel plates 6 #-10 #, there were no LME cracks in the spot-welding joint before the occurrence of welding spatter; after the occurrence of welding spatter, there were no Type B or Type C LME cracks in the spot-welding joint of the composite high-strength galvanized steel plates 6 #-10 #, the length of the Type A LME cracks did not exceed 10% of the plate thickness, and the number did not exceed 6; the length of the Type D LME cracks did not exceed 3% of the plate thickness, and the number did not exceed 3.

Example 4

Referring to FIG. 1, the original slab of DH980 was taken as the high-strength steel matrix 1. The original slab of the high-strength steel matrix 1 comprised, by mass percentage, 0.18% of C, 0.48% of Si, 2.4% of Mn, 0.021% of Cr, 0.04% of Nb, 0.02% of Ti, 0.0004% of B, 0.009% of P, 0.001% of S, 0.23% of Al, with a balance of Fe and unavoidable impurity elements.

The original slabs of IF steel DC04, cold-rolled carbon structural steel St37-2G, phosphorus high-strength steel HC220P, high-strength IF steel HC180Y, and bake-hardening steel HC180B were taken as the original slab of low carbon steel composite layer 2, respectively. The main chemical compositions of original slabs of these five low carbon steel composite layers 2 were listed in Table 6, with a balance of Fe and unavoidable impurity elements.

TABLE 6 the main chemical compositions of the original slabs of the five low carbon steel composite layers 2

| No. | Brand | C | Si | Mn | P | Nb | Ti | Ni | Cr |
|---|---|---|---|---|---|---|---|---|---|
| 11# | DC04 | 0.0015 | 0.002 | 0.114 | 0.012 | \ | \ | \ | \ |
| 12# | St37-2G | 0.075 | 0.01 | 0.612 | 0.016 | \ | 0.002 | 0.006 | 0.026 |
| 13# | HC220P | 0.026 | 0.006 | 0.414 | 0.021 | \ | 0.001 | 0.009 | 0.027 |
| 14# | HC180Y | 0.002 | 0.045 | 0.277 | 0.043 | 0.012 | 0.018 | 0.011 | 0.042 |
| 15# | HC180B | 0.0018 | 0.007 | 0.233 | 0.023 | \ | \ | 0.011 | 0.026 |

The slab raw materials of each composite layer were rolled to a thickness of 7.5:1 (the ratio of the high-strength steel matrix thickness to the thickness of one piece of low-carbon steel slab) for later use. The adjacent interfaces of each composite layer were cleaned to remove impurities such as oxide scale. The composite layers were sealed at the contact boundary by welding and vacuumed to remove the oxygen between the composite layers, and then the slabs were assembled by composite rolling. The composite high-strength galvanized steel plates 11 #-15 # with different low-carbon steel composite layers 2 were obtained through the process of—the following hot rolling—pickling-cold-rolling-annealing-hot-dip galvanizing. The details of each composite high-strength galvanized steel plate (11 #-15 #) were shown in Table 7.

(1) hot rolling: the slab was heated to 1280° C. and held for 4 h, then hot rolled with a final rolling temperature of 950° C., followed by cooled to 600° C. at a rate of 80° C./s and coiled;
(2) pickling;
(3) cold rolling: the cold rolling reduction was 40%;
(4) annealing: the steel was heated to a soaking temperature of 810° C. at a rate of 15° C./s with a holding time of 200 seconds and a dew point temperature controlled at 0° C., cooled to 670° C. at a rate of 10° C./s, then cooled to 320° C. at a rate of 60° C./s and held for 80 sec;
(6) hot-dip galvanizing: the galvanizing temperature was 450° C., and the galvanizing time was 1600 seconds. After galvanizing, it was cooled to room temperature at a cooling rate of no less than 20° C./s.

TABLE 7 the composite high-strength galvanized steel plates 11#~15# with different thickness of low-carbon steel composite layer 2

| No. | High strength steel matrix 1 (original slab) | low-carbon steel composite layer 2 (original slab) | Thickness ratio | Thickness of the composite high-strength galvanized steel plate/mm | Tensile strength of the composite high-strength galvanized steel plate /Mpa | Composite layer thickness of the composite high-strength galvanized steel plate /μm |
|---|---|---|---|---|---|---|
| 11# | DH980 | DC04 | 7.5:1 | 1.5 | 862 | 160 |
| 12# | | St37-2G | | | 890 | |
| 13# | | HC220P | | | 881 | |
| 14# | | HC180Y | | | 877 | |
| 15# | | HC180B | | | 871 | |

The composite high-strength galvanized steel plates 11 #-15 #obtained in this Example by composite rolling were evaluated for spot-welding LME sensitivity through Rapid LME Test Procedure for Coated Sheet Steels V2.0 standard issued by A/SP. The results showed that, for the composite high-strength galvanized steel plates 11 #-15 #, there were no LME cracks in the spot-welding joint before the occurrence of welding spatter; after the occurrence of welding spatter, there were no Type B or Type C LME cracks in the spot-welding joint of the composite high-strength galvanized steel plates 11 #-15 #, the length of the Type A LME cracks did not exceed 10% of the plate thickness, and the number did not exceed 6; the length of the Type D LME cracks did not exceed 3% of the plate thickness, and the number did not exceed 3.

The above content is only a preferable example of the present disclosure and is not intended to limit the protection scope of the present disclosure. Therefore, any modification, equivalent replacement, improvement, etc., within the spirit and principles of the present disclosure shall be included in the scope of the present disclosure.

What is claimed is:

1. A composite high-strength galvanized steel plate having resistance to spot-welding LME cracks, which comprises a high-strength steel matrix (1), low carbon steel composite layers (2), and a galvanized layer (3); wherein two low carbon steel composite layers (2) are affixed on two surfaces of the high-strength steel matrix (1) by composite rolling, the galvanized layer (3) is formed on the surface of at least one of the low carbon steel composite layers (2), thereby forming the composite high-strength galvanized steel plate;

wherein a tensile strength of the low carbon steel is ≤590 MPa;

wherein the composite high-strength galvanized steel plate has resistance to spot-welding LME cracks as follows: there are no LME cracks in a joint before an occurrence of welding spatter, and after the occurrence of welding spatter, a length of Type A LME cracks in the joint does not exceed 10% of the composite high-strength galvanized steel plate thickness and a number is less than 6, a length of Type D LME cracks does not exceed 3% of the composite high-strength galvanized steel plate thickness, and a number is less than 3, there are no Type B or Type C LME cracks.

2. The composite high-strength galvanized steel plate having resistance to spot-welding LME cracks according to claim 1, wherein the high-strength steel matrix (1) is a high-strength steel having a tensile strength of ≥780 MPa, or ≥980 MPa, or ≥1180 MPa.

3. The composite high-strength galvanized steel plate having resistance to spot-welding LME cracks according to claim 2, wherein the high strength steel comprises, by mass percentage, C≥0.1%, Mn≥1.0%, and Si≥0.07%.

4. The composite high-strength galvanized steel plate having resistance to spot-welding LME cracks according to claim 2, wherein the high strength steel comprises, by mass percentage, C: 0.1~0.3%, Si: 0.4~2.50%, Mn: 1.0~11.0% and Al: 0~2.0%.

5. The composite high-strength galvanized steel plate having resistance to spot-welding LME cracks according to claim 2, wherein the high strength steel is one or more selected from the group consisting of QP steel, TRIP steel, DH steel, 7Mn steel, 10Mn steel and MS steel.

6. The composite high-strength galvanized steel plate having resistance to spot-welding LME cracks according to claim 1, wherein the low carbon steel composite layers (2) is a low carbon steel comprising C and Mn, by mass percentage, the C content is ≤0.1%, the Mn content is ≤1.1% or Mn≤0.7%, the tensile strength is in a range of 150~590 MPa or 150~340 MPa.

7. The composite high-strength galvanized steel plate having resistance to spot-welding LME cracks according to claim 6, wherein the low carbon steel comprises, by mass percentage, C: 0.001~0.1%, Si: 0.001~0.50%, Mn: 0.1~1.1%, Nb: 0~0.02%, Ti: 0~0.025%, Ni: 0~0.025%, Cr: 0~0.05%, P: ≤0.05%, with a balance of Fe and unavoidable impurities; or the low carbon steel comprises, by mass percentage, C: 0.001~0.08%, Si: 0.001~0.05%, Mn: 0.1~0.7%, Nb: 0~0.02%, Ti: 0~0.025%, Ni: 0~0.025%, Cr: 0~0.05%, P: ≤0.05%, with a balance of Fe and unavoidable impurities.

8. The composite high-strength galvanized steel plate having resistance to spot-welding LME cracks according to claim 6, wherein the low carbon steel is one or more selected from the group consisting of IF steel, aluminum killed steel, cold-rolled carbon structural steel, phosphorus high-strength steel, bake-hardening steel and low-alloy steel.

9. The composite high-strength galvanized steel plate having resistance to spot-welding LME cracks according to claim 1, wherein:

in the composite high-strength galvanized steel plate, each low carbon steel composite layer (2) has a thickness of 10-200 um; and/or the galvanized layer (3) has a thickness of 4-26 um.

10. A method for preparing the composite high-strength galvanized steel plate having resistance to spot-welding LME cracks according to claim 1, which comprises the following steps:

step 1: taking an original slab of a high-strength steel matrix (1) of claim 1 and original slabs of two low-carbon steel composite layers (2), affixing the original slabs of the two low-carbon steel composite layers (2) to two surfaces of the original slab of the high-strength steel matrix (1), and welding the original slab edges of the two low-carbon steel composite layers (2) with the original slab edge of the high-strength steel matrix (1) to form a total assembled slab;

step 2: subjecting the total assembled slab to primary rolling after heating to reduce the thickness of the total assembled slab, and then hot rolling, pickling, cold rolling and annealing, so that the original slab of the high-strength steel matrix and the original slabs of the two low-carbon steel composite layers are metallurgically combined to form a billet having a tensile strength of T; and step 3: plating a galvanized layer on at least one side of the billet to form the composite high-strength galvanized steel plate.

11. The preparing method according to claim 10, wherein in step 1, before the original slab of the two low-carbon steel composite layers (2) and the original slab of the high-strength steel matrix (1) are stacked, the affixing surfaces of the high-strength steel matrix (1) and the two low-carbon steel composite layers (2) are polished and cleaned.

12. The composite high-strength galvanized steel plate having resistance to spot-welding LME cracks according to claim 2, wherein the tensile strength of the high-strength steel is 780~1500 MPa or 1180~1500 MPa.

13. The composite high-strength galvanized steel plate having resistance to spot-welding LME cracks according to claim 3, wherein the high strength steel comprises, by mass percentage, C≥0.14%, and/or Mn≥1.5%, and/or Si≥0.4%; or the high strength steel comprises, by mass percentage, C: 0.14~0.60%, Mn: 1.5~16%, Si: 0.07~2.0%; or the high strength steel comprises, by mass percentage, C: 0.14~0.30%, Mn: 1.5~3.5%, Si: 0.4~2.0%.

14. The composite high-strength galvanized steel plate having resistance to spot-welding LME cracks according to claim 6, wherein by mass percentage, the low carbon steel comprises C: 0.001~0.1% and Mn: 0.1~1.1%.

15. The preparing method according to claim 10, wherein:

the high-strength steel matrix (1) is a high-strength steel having a tensile strength of ≥780 MPa, or ≥980 MPa, or ≥1180 MPa; and/or the high strength steel comprises, by mass percentage, C≥0.1%, Mn≥1.0% and Si≥0.07%, or the high strength steel comprises, by mass percentage, C: 0.14~0.60%, Mn: 1.5~16% and Si: 0.07~2.0%, or the high strength steel comprises, by mass percentage, C: 0.14~0.30%, Mn: 1.5~3.5% and Si: 0.4~2.0%, or the high strength steel comprises, by mass percentage, C: 0.1~0.3%, Si: 0.4~2.50%, Mn: 1.0~11.0% and Al: 0~2.0%; or the high strength steel is one or more selected from the group consisting of QP steel, TRIP steel, DH steel, 7Mn steel, 10Mn steel and MS steel.

16. The preparing method according to claim 10, wherein the low carbon steel composite layers (2) are low carbon steel, wherein the low carbon steel comprises C and Mn, by mass percentage, the C content is ≤0.1%, the Mn content is ≤1.1%, the tensile strength is ≤590 MPa; or the low carbon steel comprises, by mass percentage, C: 0.001~0.1%, Si: 0.001~0.50%, Mn: 0.1~0.1.1%, Nb: 0~0.02%, Ti: 0~0.025%, Ni: 0~0.025%, Cr: 0~0.05%, P: ≤0.05%, with a balance of Fe and unavoidable impurities; or the low carbon steel comprises, by mass percentage, C: 0.001~0.08%, Si: 0.001~0.05%, Mn: 0.1~0.7%, Nb: 0~0.02%, Ti: 0~0.025%, Ni: 0~0.025%, Cr: 0~0.05%, P: ≤0.05%, with a balance of Fe and unavoidable impurities; or the low carbon steel is one or more selected from the group consisting of IF steel, aluminum killed steel, cold-rolled carbon structural steel, phosphorus high-strength steel, bake-hardening steel and low-alloy steel.

* * * * *